Patented Aug. 23, 1938

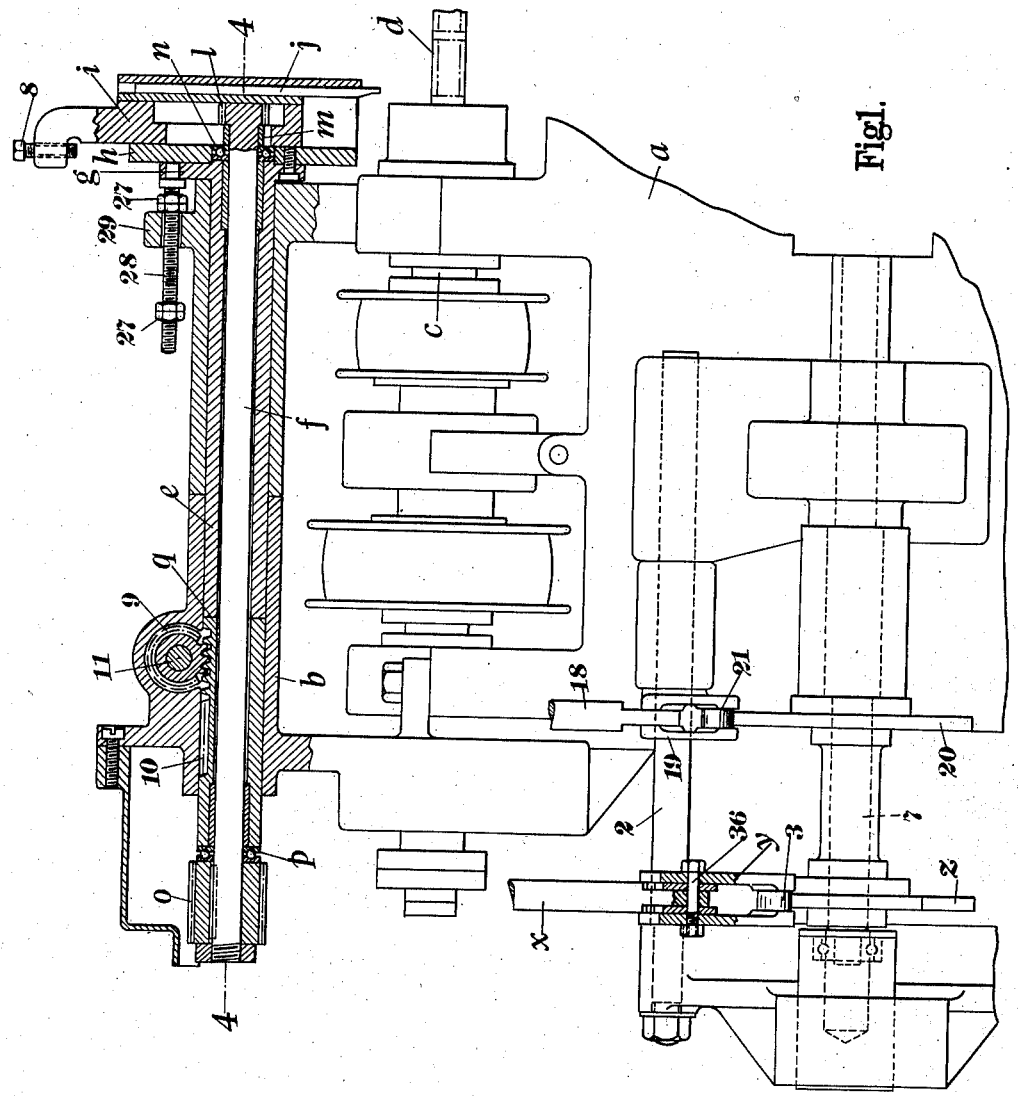

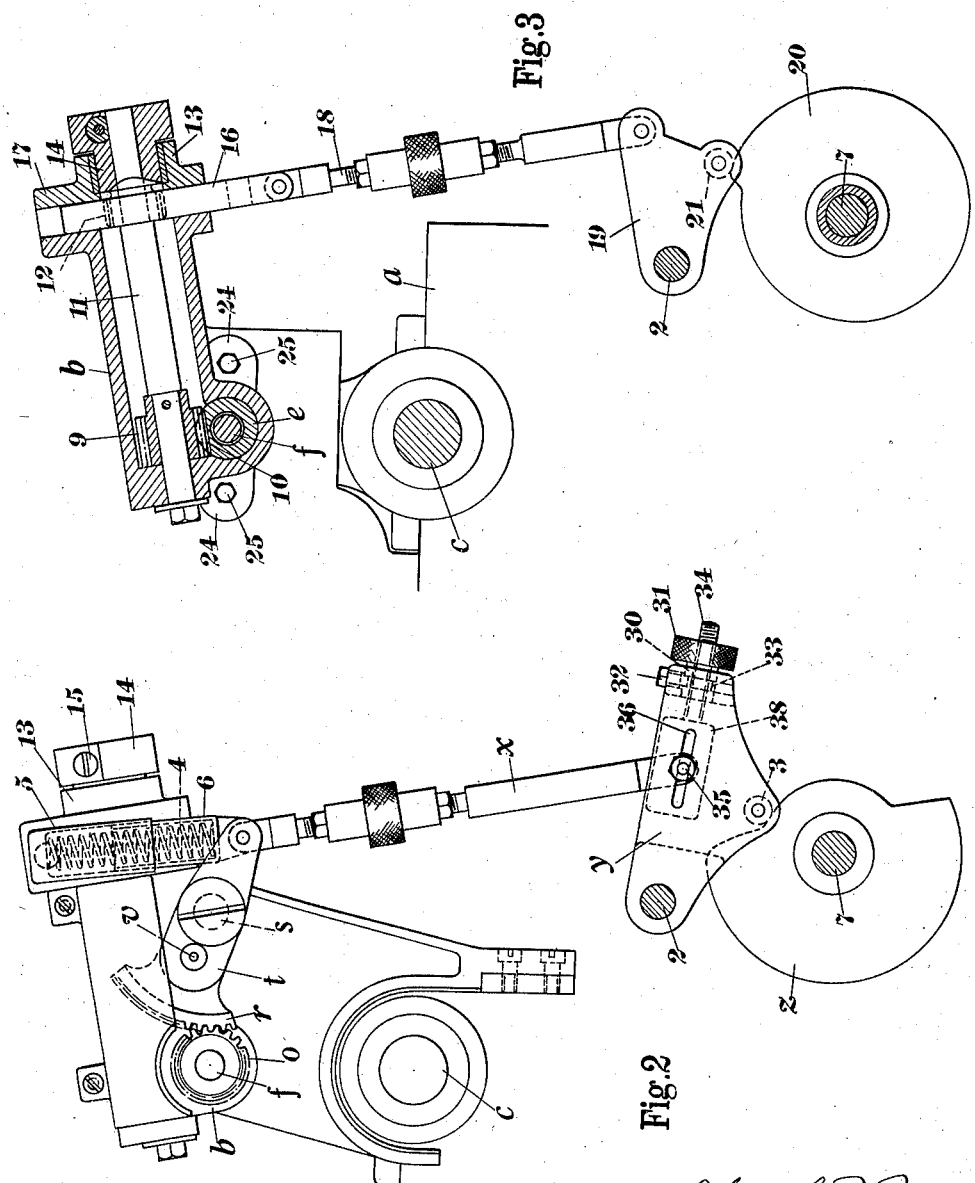

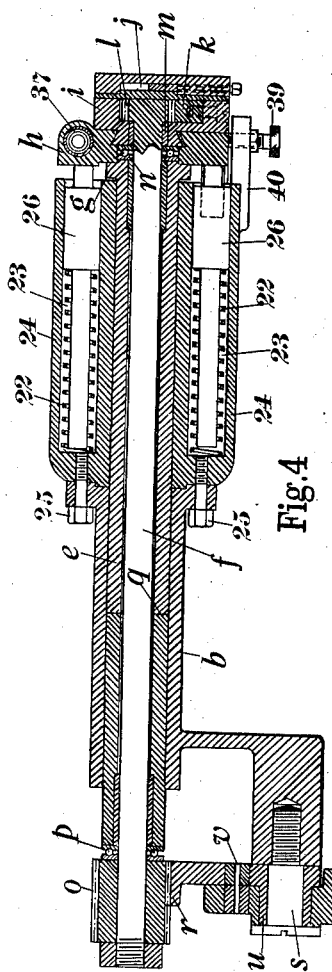

2,127,792

UNITED STATES PATENT OFFICE 2,127,792

TURNING LATHE

William Swift and Leslie Roland Perkins, Birmingham, England, assignors to Joseph Lucas Limited, Birmingham, England Application November 16, 1937, Serial No. 174,844
In Great Britain November 16, 1936

8 Claims. (Cl. 82—2)

This invention relates to lathes for performing turning operations on metal or other work pieces, and particularly to lathes of the turret and other like type provided with multiple tools for performing a plurality of different operations on the work pieces.

The object of the invention is to provide means whereby certain operations such as, for example, shaping behind a shoulder, or cutting-off, can be performed more conveniently or advantageously than by the tools ordinarily provided on the turret, main slide, cross slide or other ordinary features of the lathe.

The invention comprises the combination (either as an attachment to a lathe or as an integral part of the lathe) of a pair of coaxial spindles, the inner one of which is both slidable and rotatable and the outer one slidable only, a bearing carrying the said spindles, a guide mounted transversely on the end of the outer spindle, a tool-carrying slide on the guide, means on the inner spindle for moving the slide on the guide, and means for imparting rotational and sliding movements respectively to the two spindles.

In the three accompanying sheets of explanatory drawings:—

Figure 1 is a sectional side elevation of a lathe attachment constructed in accordance with the invention and combined with a lathe headstock.

Figure 2 is an end elevation of the attachment showing the means for imparting rotational movement to the inner spindle.

Figure 3 is a sectional end view of the attachment showing the means for imparting sliding movement to the coaxial spindles.

Figure 4 is a section on the line 4—4 of Figure 1.

Figure 5 is a view of the end of the attachment opposite to that shown in Figure 2.

Figure 6 is a fragmentary side elevation of the attachment.

In carrying the invention into effect as shown, we arrange in combination with the headstock $a$ of a lathe, a bearing $b$ which may be constructed as a separate attachment to, or as an integral part of, the lathe, the axis of this bearing being arranged parallel with the axis of the headstock spindle $c$ which carries the stock piece $d$ from which the desired articles are to be made. In the bearing $b$ are mounted a pair of coaxial spindles $e$, $f$, the outer (and hollow) spindle $e$ being slidable but non-rotatable in relation to the bearing $b$. The inner spindle $f$ is rotatable relatively to the outer spindle $e$ and is slidable with it. At one end the outer spindle $e$ is formed with a flange $g$ to which is secured a transverse guide $h$, and on this guide is mounted a slide $i$ which carries the cutting tool $j$. Preferably the guide $h$ and slide $i$ are arranged vertically above the axis of the headstock spindle $c$ as shown. Sliding of the slide $i$ on its guide $h$ is effected by means of a rack $k$ secured to the slide and engaged by a pinion $l$ on the adjacent end of the inner spindle $f$, the pinion $l$ being spaced from the adjacent end of the outer spindle $e$ by a ring $m$ and a thrust bearing $n$ on the inner spindle $f$.

Rotation of the inner spindle $f$ is effected conveniently through the agency of a long pinion $o$ which is mounted on the end of the spindle $f$ remote from the slide $i$, and which is spaced from the adjacent end of the outer spindle $e$ by a thrust bearing $p$, the latter spindle being formed in the example shown by a pair of coaxial parts the adjacent ends of which abut against each other as indicated at $q$, and the remote ends of which abut respectively against the thrust bearings $n$, $p$. The pinion $o$ is engaged by a toothed segment $r$ which is pivoted to the bearing $b$ by a pin $s$, and which is adapted to be actuated by a lever $t$. This lever is mounted on a boss $u$ formed on the toothed segment $r$ around its pivotal axis, and is connected at one end to the toothed segment by a pin $v$ adapted to be sheared off if the movement of the toothed segment is obstructed when the lever is operated. At its other end the lever $t$ is connected by an adjustable link $x$ to a pivotal member $y$ adapted to be actuated by a cam $z$. The member $y$ is pivoted on a fixed shaft 2 and is provided with a roller 3 which is maintained in contact with the periphery of the cam $z$ by a spring 4 acting on the end of the link $x$ remote from that connected to the pivotal member $y$, this spring being arranged in a two-part telescopic housing one part 5 of which is fixed, and the other part 6 of which is pivoted to the adjacent end of the link $x$. The cam $z$ is mounted on and adapted to be driven by a shaft 7 which receives motion from any convenient part of the lathe mechanism. Rotary motion in the direction for moving the cutting tool $j$ towards the work piece $d$ is imparted to the inner spindle $f$ by the cam $z$ through the mechanism above described, whilst motion in the opposite direction is imparted to this spindle by the spring 4 under the control of the cam, this latter movement being assisted by a spring-actuated plunger 37 carried by the guide $h$ and adapted to act on the slide $i$. An adjustable stop in the form of a screw 8 is mounted on the slide $i$ and is adapted to co-operate with the upper surface of the guide $h$ to determine accurately the extent of the movement of the tool $j$ towards the work piece $d$.

Joint sliding movement of the two spindles $e, f$ is effected through the agency of a pinion 9 engaging a rack 10 formed on the part of the outer spindle $e$ remote from the cutting tool $j$. This pinion 9 is secured on a rotary spindle 11 which is adapted to be actuated by another pinion 12 also mounted on the spindle 11, the two pinions 9, 12 being arranged in a housing 13 which is formed integrally with the bearing $b$ and which carries both the spindle 11 and the fixed part 5 of the housing above described. The pinion 12 is connected to the spindle 11 by a bush 14 formed integrally with the pinion and clamped on the spindle under the action of a screw 15, the bush 14 being mounted in the outer end of the housing 13, and the arrangement being such that if the movement of the pinion 9 is obstructed when the pinion 12 is actuated the latter overcomes the action of the screw 15 and rotates on the spindle 11. For actuating the pinion 12 we employ a toothed rack 16 which engages the pinion and which is slidably supported in a guide 17 formed integrally with the housing 13. The lower end of the rack 16 is connected by an adjustable link 18 to a pivotal member 19 adapted to be actuated by a cam 20. The member 19 is pivoted on the fixed shaft 2 and is provided with a roller 21 adapted to engage the periphery of the cam 20, whilst the cam 20 is mounted on and adapted to be driven by the shaft 7 which receives motion from the lathe mechanism. Sliding movement towards the left of Figure 1 is imparted jointly to the two spindles $e, f$ by the cam 20 through the mechanism above described, whilst sliding movement in the opposite direction is imparted to the spindles by springs 22, Figure 4. These springs are arranged in bores 23 formed in a bearing 24 which is connected by screws 25 to the bearing $b$ and which serves with the latter to support the spindles $e, f$. The bores 23 also contain plungers 26 which, under the action of the springs 22, abut against the adjacent side of the guide $h$. Nuts 27 adjustably mounted on a screw threaded spindle 28 are adapted to co-operate with a lug 29 on the bearing 24 to determine accurately the extent of the sliding movements that can be imparted to the spindles $e, f$, the spindle 28 being secured at one end to the flange $g$ on the outer spindle $e$, and being arranged to pass freely through a hole in the lug 29 on the bearing 24. Further, set screws 39 adjustably supported by lugs 40 on the bearing 24 co-act with the adjacent side of the guide $h$ to enable the cutting tool $j$ to be adjusted accurately in relation to the axis of the work piece $d$.

From the foregoing description it will be seen that vertical motion is imparted to the cutting tool $j$ by the cam $z$, whilst longitudinal motion is imparted to the tool by the cam 20. In the example shown the cams are arranged so that the vertical and longitudinal motions of the cutting tool took place in succession with the result that the work piece $d$ is shaped as shown in broken lines in Figure 1. But if desired the cams may be arranged so that the longitudinal and vertical motions of the cutting tool take place simultaneously, in which case the work piece is shaped to a tapered form, the angle of taper being varied as required by appropriately adjusting the connection between the link $x$ and the pivotal member $y$. In the example shown this adjustment can be effected by manipulating a nut 30, Figure 2, having a knurled head 31. The nut 30 is rotatably connected to the pivotal member $y$ by a screw 32 which engages an annular groove 33 in the nut and prevents axial movement of the latter in relation to the pivotal member $y$. Also the nut 30 is mounted on a screw threaded member 34 extending from the adjacent end of a block 38 to which the lower end of the link $x$ is connected by a pin 35 engaging slots 36 in the pivotal member $y$. By manipulating the nut 30 the amplitude of the vertical movements imparted to the cutting tool may be varied to suit different requirements.

When the mechanism above described is used in an automatic lathe the motions of the spindles $e, f$ are suitably co-ordinated with the movements of the tools carried by the turret or main slide, cross slide or other ordinary parts of the lathe.

By means of the mechanism above described we are able to effect certain cutting operations on the work piece, such as shaping behind a shoulder, cutting-off, or the like more conveniently or advantageously than with the tools normally provided on the lathe.

Having thus described our invention what we claim as new and desire to secure by Letters Patent is:—

1. A lathe or lathe attachment comprising the combination of a pair of coaxial spindles arranged one within the other, the inner spindle being both slidable and rotatable, and the outer spindle being nonrotatable but slidable with said inner spindle, a bearing carrying said spindles, a guide mounted transversely on one end of said outer spindle, a tool-carrying slide on said guide, means on said inner spindle for moving said slide on said guide, a pinion on said inner spindle, a toothed member engaging said pinion, a cam for imparting movement in one direction to said toothed member, spring means for imparting movement in the opposite direction to said member, and means for imparting sliding movement to said outer spindle.

2. A lathe or lathe attachment comprising the combination of a pair of coaxial spindles arranged one within the other, the inner spindle being both slidable and rotatable, and the outer spindle being non-rotatable but slidable with said inner spindle, a bearing carrying said spindles, a guide mounted transversely on one end of said outer spindle, a tool-carrying slide on said guide, means on said inner spindle for moving said slide on said guide, means for imparting rotational movement to said inner spindle, a toothed rack on said outer spindle, a pinion engaging said rack, a cam for actuating said pinion to impart sliding movement in one direction to said outer spindle, and spring means for imparting sliding movement in the opposite direction to said outer spindle.

3. A lathe or lathe attachment comprising the combination of a pair of coaxial spindles arranged one within the other, the inner spindle being both slidable and rotatable, and the outer spindle being non-rotatable but slidable with said inner spindle, a bearing carrying said spindles, a guide mounted transversely on one end of said outer spindle, a tool-carrying slide on said guide, means on said inner spindle for moving said slide on said guide, a pinion on said inner spindle, a toothed segment engaging said pinion, a pivotal member, a link interconnecting said segment and said pivotal member, a cam for moving said pivotal member in one direction, a spring acting on the end of said link remote from said pivotal member for imparting movement in the opposite direction to said pivotal member, and means for imparting sliding movement to said outer spindle.

4. A lathe or lathe attachment comprising the combination of a pair of coaxial spindles arranged one within the other, the inner spindle being both slidable and rotatable, and the outer spindle being non-rotatable but slidable with said inner spindle, a bearing carrying said spindles, a guide mounted transversely on one end of said outer spindle, a tool-carrying slide on said guide, means on said inner spindle for moving said slide on said guide, means for imparting rotational movement to said inner spindle, a toothed rack on said outer spindle, a pinion engaging said rack, a pivotal member, a cam for moving said pivotal member in one direction, spring means for imparting movement in the opposite direction to said pivotal member, rack-and-pinion mechanism for transmitting motion from said pivotal member to said pinion, and a link interconnecting said mechanism and pivotal member.

5. A lathe or lathe attachment comprising the combination of a pair of coaxial spindles arranged one within the other, the inner spindle being both slidable and rotatable, and the outer spindle being non-rotatable but slidable with said inner spindle, a bearing carrying said spindles, a guide mounted transversely on one end of said outer spindle, a tool-carrying slide on said guide, means on said inner spindle for moving said slide on said guide, a pinion on said inner spindle, a toothed segment engaging said pinion, a lever, a shearable connection between said lever and said segment, a pivotal member, a link interconnecting said lever and said pivotal member, a cam for moving said pivotal member in one direction, a spring acting on the end of said link remote from said pivotal member for imparting movement in the opposite direction to said pivotal member, and means for imparting sliding movement to said outer spindle.

6. A lathe or lathe attachment comprising the combination of a pair of coaxial spindles arranged one within the other, the inner spindle being both slidable and rotatable, and the outer spindle being non-rotatable but slidable with said inner spindle, a bearing carrying said spindles, a guide mounted transversely on one end of said outer spindle, a tool-carrying slide on said guide, means on said inner spindle for moving said slide on said guide, means for imparting rotational movement to said inner spindle, a toothed rack on said outer spindle, a pinion for engaging said rack, a rotary shaft carrying said pinion, a pivotal member, a cam for moving said pivotal member in one direction, spring means for imparting movement in the opposite direction to said pivotal member, rack-and-pinion mechanism for transmitting motion from said pivotal member to said pinion, said mechanism including a pinion mounted on said shaft so that said mechanism can be actuated if movement of said shaft is obstructed, and a link interconnecting said mechanism and pivotal member.

7. A lathe or lathe attachment comprising the combination of a pair of coaxial spindles arranged one within the other, the inner spindle being both slidable and rotatable, and the outer spindle being non-rotatable but slidable with said inner spindle, a bearing carrying said spindles, a guide mounted transversely on one end of said outer spindle, a tool-carrying slide on said guide, means on said inner spindle for moving said slide on said guide, a pinion on said inner spindle, a toothed member engaging said pinion, a pivotal member, a link interconnecting said toothed member and said pivotal member, said link having an adjustable connection with said pivotal member, a cam for moving said pivotal member in one direction, a spring acting on the end of said link remote from said pivotal member for imparting movement in the opposite direction to said pivotal member, and means for imparting sliding movement to said outer spindle.

8. A lathe or lathe attachment comprising the combination of a pair of coaxial spindles arranged one within the other, the outer spindle being slidable but non-rotatable, and the inner spindle being slidable with and rotatable relatively to said outer spindle, means for preventing relative sliding movement between said spindles, a bearing carrying said spindles, a guide mounted transversely on one end of said outer spindle, a tool-carrying slide on said guide, means on said inner spindle for moving said slide on said guide, means for imparting rotational movement to said inner spindle, and means acting on said outer spindle for imparting joint sliding movement to the two spindles.

WILLIAM SWIFT.
LESLIE ROLAND PERKINS.